June 20, 1939.  J. H. VAN UUM  2,163,455
RESILIENT SECURING DEVICE
Filed Dec. 5, 1934  2 Sheets-Sheet 1

INVENTOR.
John H. Van Uum,
BY
Justin W. Macklin,
ATTORNEY.

June 20, 1939.   J. H. VAN UUM   2,163,455
RESILIENT SECURING DEVICE
Filed Dec. 5, 1934   2 Sheets-Sheet 2

INVENTOR.
John H. Van Uum,
BY
Justin W. Macklin,
ATTORNEY.

Patented June 20, 1939

2,163,455

UNITED STATES PATENT OFFICE 2,163,455

RESILIENT SECURING DEVICE

John H. Van Uum, Lakewood, Ohio

Application December 5, 1934, Serial No. 756,127

1 Claim. (Cl. 24—213)

The object of this invention is to provide a simple efficient device for conveniently securing a plurality of perforated elements in superposed relation by extending through registering openings in said elements.

A further object is to so construct the fastening device that it may be readily passed through an opening or openings in either or both of the elements and which shall thereafter securely hold the same under constant tension urging them together.

Still another object is to so construct the device that it may be readily adapted to retain a flanged cap or member without interfering with its effectiveness in retaining the said superposed elements.

Still another object is to avoid tangling or interlocking of the elements when handled or shipped in bulk, that is, large numbers of them being thrown together.

Other objects will become apparent from the following description which relates to the drawings, in which Fig. 1 is a side elevation of my fastening device shown in position securing two flat superposed elements together.

Figure 2:
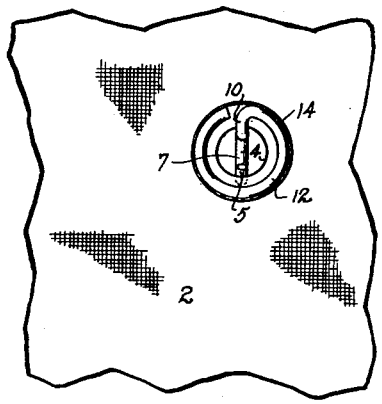
Fig. 2 is a plan view of the same with the cap portion in section.
Figure 1:
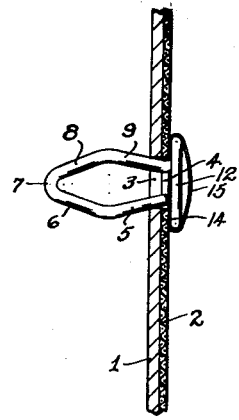
Figure 3:
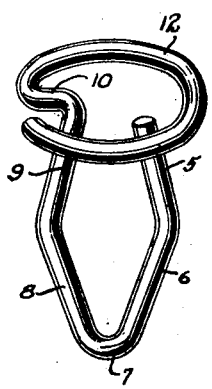
Fig. 3 is an enlarged perspective of the wire body of the clip or fastener.

In securing of floor mats, carpeting, side wall panels, upholstery, etc. in automobiles, my fastener of the type shown in Figs. 1 to 3 is particularly useful, in which 1 indicates a sheet or flanged portion of the frame of the automobile. 2 designates the carpeting, mat or upholstery covering to be tightly held thereto. Through the members 1 and 2 are registering openings indicated at 3 and 4.

The clip comprises essentially a diamond-shaped wire spring portion adapted to be passed through these openings. This diamond-shaped portion may be formed at one end of a single piece of round wire turned so that the leg portion 5 slopes outwardly slightly and then inwardly as at 6, joining at 7 in a rounded nose portion with the leg member 8. This leg in turn joins a portion 9 extending outwardly from the center as does the member 5, but oppositely therefrom, and is then joined to the short radially extending portion 10, which in turn joins with a circular portion 12 forming the head of the element.

The clip may be used in this form to hold two sheets or elements together by passing through registering openings in which it will be seen that the nose portion 7 serves as a guide facilitating passing through the openings while the relatively diverging members 6 and 8 are wedged through the openings to pass the rounded knees between 5 and 6, and 8 and 9 respectively, the spring action occurring primarily in the nose bend at 7 and the leg portions 5 and 6 being free at one end, allowing considerable freedom of movement. The subsequent tendency of the portions 5 and 9 to spread outwardly relatively centers the device in the registering openings, causing it to fit tightly, even though there is not close or accurate registration of the openings in Figs. 1 or 2, for example.

When in position a constant tension of the diamond-shaped leg portions inwardly exerts a tendency to push the head loop against the sheet 2, thus effectively and firmly holding or fastening the members 1 and 2 together while still permitting removal and replacement of the member 2, which as stated may be upholstery, carpet, mat or the like.

In the use with carpeting, or wherever the head is exposed it is preferable to expose the head 12 with an inwardly turned flange 14 of a dome-shaped cap 15, preferably quite flat, as shown in Fig. 1. The loop or circular portion 12 is simply compressed slightly to permit it to be inserted inside of the inturned flange 14, as is well known in connection with certain forms of button heads such as campaign buttons or the like. The essential advantages of this particular form are that the closed nose of the diamond member avoids catching upon or tearing of the fabric of the edges in which it is shaped, and in case of failure to closely register the openings 3 or 4, there is no exposed end of the wire to engage the metal flange 1 at the side of the opening. This has been found in some forms of fasteners to result in collapsing or distorting the fastener, rendering it useless or ineffective.

Figure 5:
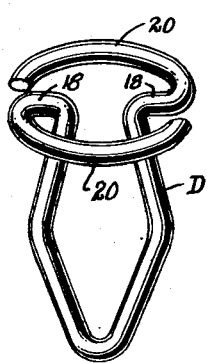
Fig. 5 is an enlarged perspective of this latter form of fastener without the cap.
Figure 4:
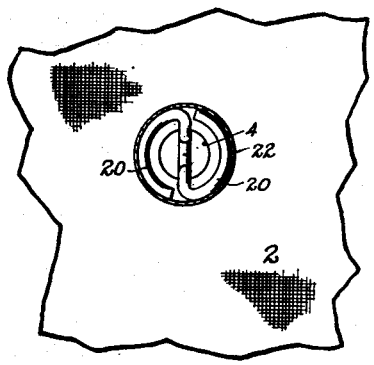
Fig. 4 is a view similar to Fig. 2 showing a slightly modified form of the fastener.

In the form shown in Fig. 5 instead of having one leg of the diamond-shaped loop free, the diamond is designated generally by the letter D, and it will be seen that it is formed on the intermediate portion of a wire strip and as joined by short radial sections 18 with two arcuate portions 20 which fit more or less loosely inside of flange 22 of a button as before described. This has the advantage of slightly greater relative stiffness of the leg portions but requires a slight looseness or capability of movement within the flange of the cap.

Figure 6:
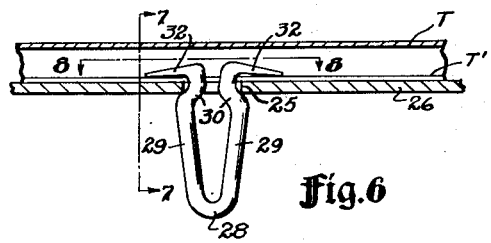
Fig. 6 is a side elevation of another form of my fastener showing its use with molded hollow beading shown in section.
Figure 7:
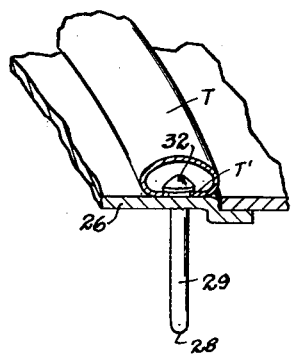
Fig. 7 is a sectional perspective view at right angles to the plane of Fig. 6 as indicated by the line 7—7 of Fig. 6.
Figure 8:
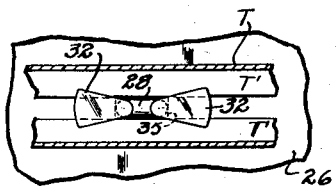
Fig. 8 is a sectional view on a plane indicated by the line 8—8 of Fig. 6.
Figure 9:
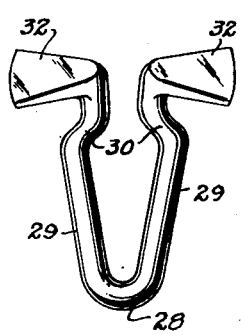
Fig. 9 is an enlarged perspective view of this form of fastener.

Trim or beading formed of hollow rolled metal stock such as indicated at T, Figs. 6, 7 and 8, having inwardly turned flanges slightly separated as at T¹ is frequently used between metal wall panels, and also on radiator and hood constructions of automobiles (as for example the trim surrounding the radiator louvers of the present model Ford motor cars). To securely hold these elements T while permitting them to be quickly applied affords a considerable problem. This problem is aggravated by the beading becoming distorted and in instances where beading is caused to go around curved surfaces requiring that it be held against its normal tendency to straighten. In any such case the securing device must be capable of being loosely engaged to move longitudinally in the slot or opening between the two flanges T¹ and at the same time it must pass comparatively easily through an opening as at 25 in the wall or radiator frame element such as indicated at 26. Yet when in position the constant inward tension of the fastener must be pronounced, and in addition the removal should be very difficult. Such beading whether applied to walls or automobile radiator trim is usually intended to be permanently fixed.

However, it is an object of the design of some forms of my clips as shown in Figs. 6 to 11, that they may be capable of being moved by compressing the loop portion from the side opposite the beading or the like element being retained thereby. Referring further to Figs. 6, 7 and 8, I have found that a very simple effective and cheaply manufactured construction may be made by looping the middle portion of a round wire of suitable resiliency and stiffness, forming a nose as at 28, diverging log portions 29, and abruptly inwardly extending portions 30 from which the wire extends upwardly, and at its ends is especially formed into flattened flaring wedge-shaped members 32.

It will be seen that these wedge members at the points where they join the wire are of approximately the width of the wire but they flare outwardly materially as shown in Fig. 8, so as to overlap both sides of the openings or slots engaging both inturned edges or flange portions T² of the bead member.

The angle of the inner or under face as shown in Fig. 6 is such as to cause the outer ends of these portions 32 to press downwardly, constantly exerting a tension between the shoulder of the portions 30 and the ends of these wedge portions 32.

The method of forming such a construction is comparatively simple in that it involves simple bending operations and by die members giving an anvil and hammer action flattening the ends of the wire, and at the same time these members 32 are given the proper downward angle with relation to the center line of the loop described. Here as before the rounded nose 28 effectively guides the fastener through its opening and without danger of distortion or catching upon the parts being secured, or in the opening to which the beading or like member is secured.

The openings may be either rectangular as indicated at 35 or they may be circular where very accurate alignment of the beading is not required. It will be seen that with a number of these devices with their heads placed inside of the beading, the beading may be conveniently applied by simply sliding the fasteners along the beading to the points opposite the respective openings. They are simply pressed inwardly until the shoulders 30 engage below or inside of the flange or wall member 26. This relative sliding of the clips is thus another advantage, permitting convenient application and adjustment to longitudinal position of the beading on the member to which it is to be secured.

Figure 10:
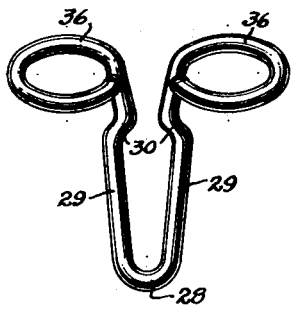
Fig. 10 is an enlarged perspective of a modified form for the purpose shown in Figs. 6, 7 and 8.
Figure 11:
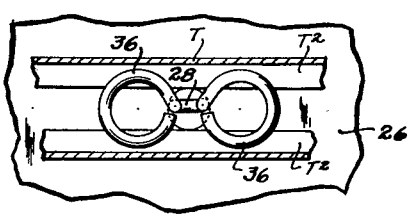
Fig. 11 is a transverse sectional plan showing the use of the type of fastener in Fig. 10.

There are forms of such beading in which the inturned flanges as at T² are comparatively widely separated. This makes it impractical to flatten the wedge portions sufficiently to obtain the desired width. A comparatively convenient and cheaply manufactured form of such bead holding clip is illustrated in Figs. 10 and 11, which will effectively engage the comparatively widely separated flanges T². Here as before the middle portion of the spring wire is bent to form the nose as at 28, the diverging legs 29 and the inwardly extending abrupt wedge shoulders 30, as before, from which wires extend upwardly and join with substantially circular eyelets 36. The formation of such a fastener is a comparatively simple operation in a modern wire bending machine, the clips being first formed and the wires being bent to form the eyelets, and the offset shoulders being formed as by suitable bending die devices.

Fig. 11 shows particularly the engagement of the loops 36 with comparatively widely separated flanges T². In each of these forms it should be particularly noted that the abruptness of the portions 30 with relation to the center line of the loop or fastener is such that the outward tension due to the legs 29 pressing outwardly away from each other causes a very effective wedging action, and further this abruptness locks the parts together so firmly that the pull on the parts themselves will not separate them unless the force used is so great as to break or destroy the elements. However, by engaging the lugs 29, for example as by a pair of pincers applied from the opposite side of the bead T or other member being secured to and compressing the legs of the fastener, the removal is readily accomplished.

I claim:

A fastener for securing an element having an opening to an apertured support comprising a single strip of spring wire having one portion, beginning at one terminus of the strip of wire, in the form of an open arcuate head portion yieldably engageable with the element, a portion of the strip contiguous to and at the end of the said head portion remote from the free end of the head portion extending radially of the head portion and spaced from the said free end of the head portion and terminating in spaced relation radially of the head portion from the center thereof, and a portion contiguous to the radially extending portion and extending abruptly from the plane of the head portion and being in the form of a substantially diamond shaped loop, said diamond shaped loop having a portion intermediate its ends in the form of a blunt rounded nose with legs divergent from the nose toward the head portion part-way of their length and convergent toward the head portion for the remainder of their length, the one of said convergent legs beyond the nose from the said radial portion of the wire being spaced for its full length from said arcuate head portion and remainder of the diamond shaped loop and terminating at the other terminus of said strip of wire and having its free end disposed in outwardly spaced relation radially of the head portion from the center thereof and inwardly spaced relation radially from the periphery thereof and being capable of bodily movement toward and away from the other leg, said diamond shaped loop being symmetrical with respect to the axis of the arcuate head portion and receivable in the opening in the member and in an aperture of said support by flexure of said diamond shaped loop, and said convergent leg portions being engageable with said aperture and opening upon reflexure of said loop.

JOHN H. VAN UUM.